Patented Apr. 28, 1953

2,636,877

UNITED STATES PATENT OFFICE 2,636,877

CATALYTIC POLYMERIZATION OF ANHYDRO-N-CARBOXY ALPHA-AMINO ACIDS

Denis Coleman, Blackley, Manchester, England, assignor to Imperial Chemical Industries Limited, a corporation of Great Britain No Drawing. Application November 10, 1949, Serial No. 126,683. In Great Britain November 18, 1948

5 Claims. (Cl. 260—77.5)

This invention relates to polymerisation catalysts and more particularly to catalysts for the polymerisation of anhydrocarboxy-α-amino acids.

The solution polymerisation of anhydrocarboxy α-amino acids and the co-polymerisation of mixtures thereof proceeds in organic solutions, in the presence of water, at a very slow rate at normal temperatures; the reaction is usually completed only after several weeks. It has now been found that certain substances act as catalysts for the polymerisation and reduce the time of reaction to a few days.

Thus according to the present invention there is provided a process for the manufacture of polymeric substances which comprises polymerising or co-polymerising anhydrocarboxy α-amino acids in the presence of the sodium or potassium salt of an α-amino carboxylic acid.

The starting materials in the process of the invention are the anhydrocarboxy derivatives of any α-amino carboxylic acids; examples of such acids are glycine, sarcosine, N-phenylglycine, pyrrole-α-carboxylic acid, proline, α-aminocyclohexane carboxylic acid, alanine, valine, phenylalanine, laucine, cysteine, methionine, tyrosine, glutamic acid, lysine, histine and α-aminoisobutyric acid. The anhydrocarboxy derivatives may in general be obtained by phosgenating the acids.

The polymerisation of the anhydrocarboxy derivatives is effected preferably in solution; suitable solvents are for example benzene, chloroform, ethyl acetate and dioxan. The reaction proceeds at room temperature but elevated temperatures, for example about 50° C., may be used if desired. The sodium or potassium salts of α-amino carboxylic acids may be added to the reaction mixture as such, preferably in the absence of water, or they may be reduced in situ for example, by adding anhydrous sodium carbonate, sodium bicarbonate,

or sodium hydroxide or the corresponding potassium compounds to the reaction mixture in the presence of sufficient water to enable the formation of the sodium or potassium salts of the α-amino acids. That embodiment of the invention wherein the sodium or potassium salts are produced in situ possesses the advantage of avoiding the use of dry solvent; the preferred addition in this embodiment is sodium or potassium carbonate, because they give solutions of highest viscosity and have the most rapid action.

When the process of this invention is carried out in the presence of water, low molecular weight products are obtained. The preferred polymeric substances produced by the process of this invention in the absence of water are obtained after removal of the solvent as optically clear, flexible films. The moisture regain is low (2%) but they may readily be dyed with basic dyes. They are useful for the manufacture of fibres, and as textile finishing agents. The nature of the product of the polymerisation varies with the proportions of the sodium or potassium salt included in the reaction mixture; thus with lower proportions of the salt, of the order of 2.0% NaCO₃, or 1.0% sodium phenylalaninate the polymerisation product is obtained as a clear, flexible film with a molecular weight of about 15,000 as determined from the end groups; with the higher proportions of the salt, of the order of 10.0% Na₂CO₃ or 2.0% sodium phenylalaninate the polymerisation product is of a much lower molecular weight, and forms extremely brittle films.

In some cases, for example the co-polymers obtained from N-anhydrocarboxy l-leucine, and N-anhydrocarboxy dl-phenylalanine, and from the derivatives of dl-phenylalanine and α-amino-iso-butyric acid the polymerisation products can be cast from solution to form films possessing exceptionally high resistance to attack by acid and alkali. Preferred proportions of the sodium or potassium salt of the amino acid to be used for the production of such polymers are 0.5 to 1.5% sodium phenylalaninate or potassium phenylalaninate.

The invention is illustrated but not limited by the following examples in which parts and percentages are by weight. Atmospheric moisture is excluded in all cases by means of guard tubes containing magnesium perchlorate and calcium sulphate.

Example 1

5 parts of sodium phenylalaninate are added to a mixture of 6100 parts of sodium-dried benzene, 382 parts of anhydrocarboxyphenylalanine and 129 parts of anhydrocarboxy α-amino isobutyric acid and the mixture is agitated at room temperature. The viscosity of the solution increases steadily and after 6 days, films can be cast from the solution.

Example 2

The process of Example 1 is repeated using benzene containing 0.05% of water in place of the sodium-dried benzene. The rate of increase in viscosity is slower and 8 days are required for completion of the reaction.

Example 3

The process of Example 1 is repeated using 4.5 parts of sodium lysinate in place of the sodium phenyl alaninate. After 6 days films could be cast from the solution.

Example 4

The process of Example 2 is repeated using 10 parts of sodium carbonate in place of the sodium phenylalaninate. The reaction proceeds exactly as in Example 1.

Example 5

314 parts of anhydrocarboxy l-leucine, 382 parts of anhydrocarboxy dl-phenylalanine and 10 parts of sodium carbonate are added to 6100 parts of benzene containing 0.05% of water and the mixture is agitated at room temperature. After 3 days the solution is highly viscous, almost at the gelling stage, and films may be cast from it.

Example 6

1 part of sodium $\alpha$-aminoisobutyrate is added to 66 parts of anhydrocarboxyphenylalanine and 33 parts of anhydrocarboxy $\alpha$-aminoisobutyric acid in 1200 parts of benzene and the mixture is agitated at room temperature. After 8 days films can be cast from the solution.

Example 7

1 part of potassium l-leucinate is used in place of the sodium $\alpha$-aminoisobutyrate in Example 6. After 7 days films can be cast from the solution.

Example 8

1 part of sodium phenylalaninate is added to 62.8 parts of anhydrocarboxy l-leucine and 78.8 parts of anhydrocarboxyphenylolamine in 2000 parts of dry benzene. The mixture is heated at 80° C. for 50 hours, after which time tough films can be cast from the solution.

I claim:

1. A process for the manufacture of polymeric substances from anhydro-N-carboxy-$\alpha$-amino acids which comprises forming a polymerization mixture of the anhydro-N-carboxy $\alpha$-amino acid with an alkali metal compound selected from the group consisting of the sodium and potassium salts of $\alpha$-amino carboxylic acids and the carbonates, bicarbonates and hydroxides of sodium and potassium, and polymerizing the anhydro-N-carboxy $\alpha$-amino acid in an inert solvent medium containing up to .05% by weight of water, the reaction medium being free of water when the alkali metal compound added to the anhydro-N-carboxy $\alpha$-amino acid is the salt of an $\alpha$-amino carboxylic acid and containing water in a quantity of up to .05% by weight when said alkali metal compound is one of the designated carbonates, bicarbonates and hydroxides to thereby form in situ the corresponding salt of an $\alpha$-amino acid by reaction with the anhydro-N-carboxy-$\alpha$-amino acid, the alkali metal compound combined with said anhydro-N-carboxy $\alpha$-amino acid being sufficient to provide in the polymerization mixture from about 0.5% to 1.5%, by weight of the polymerizable reactant, of alkali metal salt of $\alpha$-amino carboxylic acid as catalyst for the polymerization.

2. A process as claimed in claim 1 wherein the alkali metal compound combined with the anhydro-N-carboxy $\alpha$-amino acid is sodium carbonate added in sufficient quantity to provide in the polymerization mixture from about 0.5 to 1.5% by weight of the sodium salt of an $\alpha$-amino acid.

3. A process as claimed in claim 1 wherein a mixture of anhydro-N-carboxy $\alpha$-amino acids is copolymerized.

4. A process as claimed in claim 1 wherein a mixture of anhydro-N-carboxy $\alpha$-amino acids which are derived from dl-phenylalanine and l-leucine is copolymerized.

5. A process as claimed in claim 1 wherein a mixture of the anhydro-N-carboxy $\alpha$-amino acids which are derived from dl-phenylalanine and $\alpha$-aminoisobutyric acid is copolymerized.

DENIS COLEMAN.

References Cited in the file of this patent

UNITED STATES PATENTS

| Number | Name | Date |
|---|---|---|
| 2,534,283 | MacDonald | Dec. 19, 1950 |

OTHER REFERENCES

Wessely Hoppe-Seyler Zeitschrift für Physiologische Chemie, vol. 146, 1925, pp. 72 to 74, 85, and 86.

Woodward et al., Journ. Amer. Chem. Soc., vol. 69, page 1552, 1947.

Wessely Hoppe-Seyler, Zeitschrift für Physiologische Chemie, vol. 146, 1925, pages 83 and 84.